(12) United States Patent
Fischer et al.

(10) Patent No.: US 9,453,444 B2
(45) Date of Patent: Sep. 27, 2016

(54) DEVICE FOR DISTRIBUTING FLUIDS IN EXHAUST SYSTEMS

(75) Inventors: Michael Fischer, Herrenberg (DE); Michael Müller, Nagold (DE); Jürgen Schmidt, Muhlacker (DE)

(73) Assignee: FRIEDRICH BOYSEN GMBH & CO. KG, Altensteig (DE)

( * ) Notice: Subject to any disclaimer, the term of this patent is extended or adjusted under 35 U.S.C. 154(b) by 99 days.

(21) Appl. No.: 13/976,299

(22) PCT Filed: Oct. 27, 2011

(86) PCT No.: PCT/EP2011/005438
§ 371 (c)(1),
(2), (4) Date: Oct. 16, 2013

(87) PCT Pub. No.: WO2012/089290
PCT Pub. Date: Jul. 5, 2012

(65) Prior Publication Data
US 2014/0033686 A1 Feb. 6, 2014

(30) Foreign Application Priority Data
Dec. 27, 2010 (DE) .................. 10 2010 056 314

(51) Int. Cl.
*F01N 3/00* (2006.01)
*F01N 3/10* (2006.01)
(Continued)

(52) U.S. Cl.
CPC .............. *F01N 3/10* (2013.01); *B01F 3/04049* (2013.01); *B01F 5/0451* (2013.01);
(Continued)

(58) Field of Classification Search
CPC B01F 3/04049; B01F 5/0451; B01F 5/0473; B01F 5/061; B01F 5/0616; F01N 3/2066; F01N 3/2892; F01N 13/08
USPC ............................................................ 60/286
See application file for complete search history.

(56) References Cited

U.S. PATENT DOCUMENTS 6,401,455 B1 *  6/2002  Mathes et al. .................. 60/286
6,449,947 B1 *  9/2002  Liu et al. ......................... 60/286
(Continued)

FOREIGN PATENT DOCUMENTS

CN  101302957 A  11/2008
CN  101349181 A  1/2009
(Continued)

OTHER PUBLICATIONS

German Search Report for corresponding DE App. No. 10 2010 056 314.5 dated Nov. 22, 2011; 7 pgs.
(Continued)

*Primary Examiner* — Jason Shanske
(74) *Attorney, Agent, or Firm* — Cantor Colburn LLP

(57) ABSTRACT

An apparatus for distributing fluids in an exhaust system of an internal combustion engine. The apparatus includes an injection device, wherein a combination of a plurality of individual measures for achieving a uniform mixing of the fluids with the exhaust gas and a complete vaporizing of the fluids in the exhaust gas is provided. The individual measure comprises at least one of at least one swirl-generating device and at least one mixing apparatus. The individual measure also includes at least one catalyst. The individual measure further includes an injection nozzle of the injection device which is arranged at a predefined spacing from a wall of the exhaust tract.

25 Claims, 5 Drawing Sheets

Figure 1:
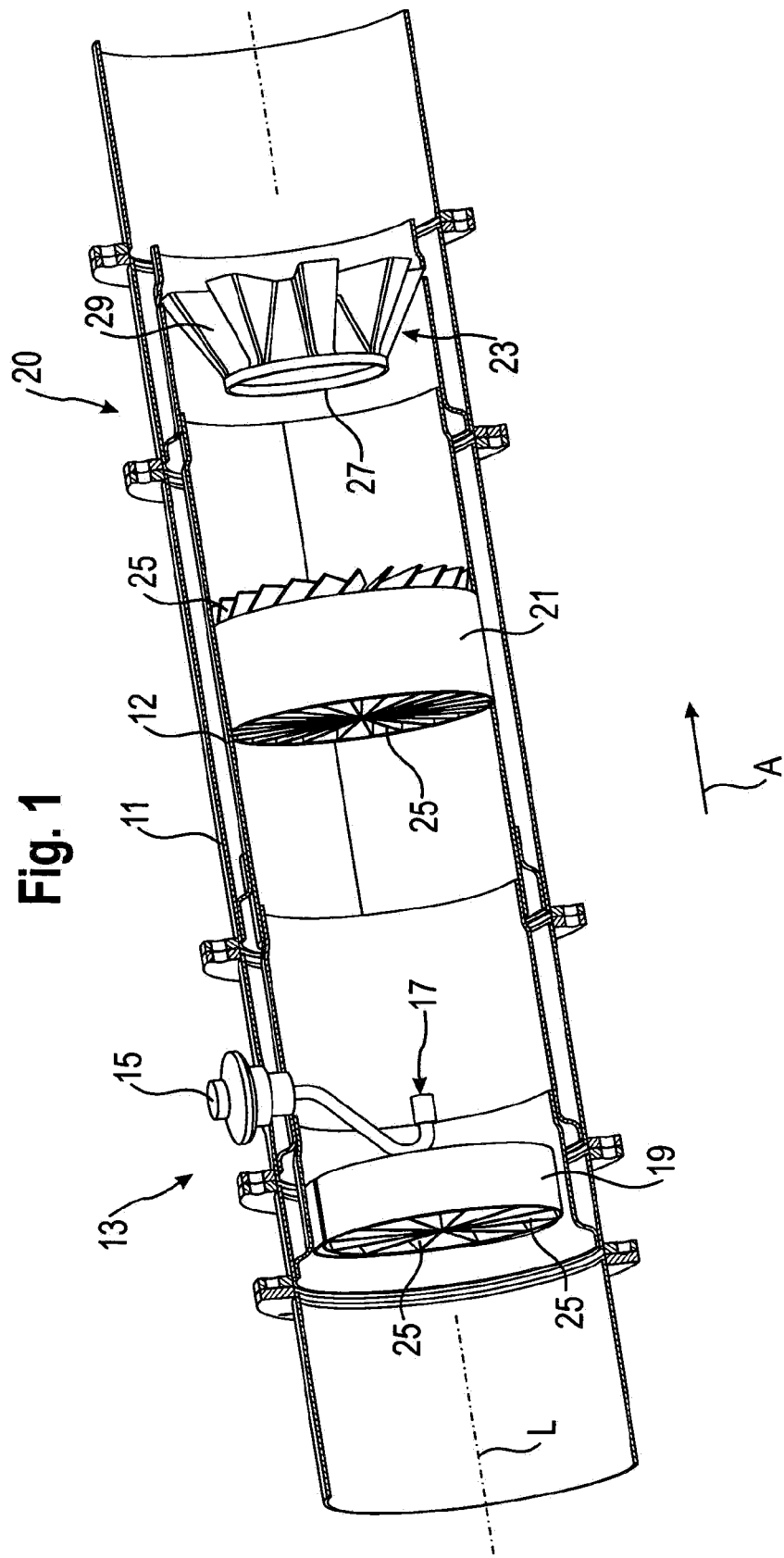

(51) Int. Cl.
*B01F 3/04* (2006.01)
*B01F 5/04* (2006.01)
*B01F 5/06* (2006.01)
*F01N 3/20* (2006.01)
*F01N 3/28* (2006.01)
*F01N 13/08* (2010.01)
*F01N 13/18* (2010.01)

(52) U.S. Cl.
CPC ............ *B01F 5/0473* (2013.01); *B01F 5/061* (2013.01); *B01F 5/0616* (2013.01); *F01N 3/2066* (2013.01); *F01N 3/2892* (2013.01); *F01N 13/08* (2013.01); *F01N 13/1816* (2013.01); *F01N 2240/20* (2013.01); *F01N 2240/40* (2013.01); *F01N 2290/04* (2013.01); *F01N 2470/24* (2013.01); *F01N 2610/02* (2013.01); *F01N 2610/1453* (2013.01); *Y02T 10/24* (2013.01)

(56) References Cited

U.S. PATENT DOCUMENTS

| | | | |
|---|---|---|---|
| 6,453,830 B1* | 9/2002 | Zauderer | 110/345 |
| 2005/0172615 A1* | 8/2005 | Mahr | 60/286 |
| 2006/0257303 A1* | 11/2006 | Telford | 423/239.1 |
| 2007/0163241 A1* | 7/2007 | Meingast et al. | 60/286 |
| 2007/0245718 A1* | 10/2007 | Cheng et al. | 60/286 |
| 2008/0193353 A1* | 8/2008 | Hirschberg | B01F 5/0451 423/239.1 |
| 2008/0250776 A1* | 10/2008 | Brown et al. | 60/299 |
| 2008/0264041 A1* | 10/2008 | Gerlach | 60/286 |
| 2009/0000287 A1* | 1/2009 | Blaisdell et al. | 60/324 |
| 2009/0019843 A1* | 1/2009 | Levin et al. | 60/303 |
| 2009/0056319 A1* | 3/2009 | Warner et al. | 60/299 |
| 2009/0084094 A1 | 4/2009 | Goss et al. | |
| 2009/0092525 A1* | 4/2009 | Ichikawa | 422/177 |
| 2009/0266064 A1* | 10/2009 | Zheng et al. | 60/317 |
| 2009/0301067 A1* | 12/2009 | Dingle et al. | 60/286 |
| 2010/0212301 A1* | 8/2010 | De Rudder et al. | 60/299 |

FOREIGN PATENT DOCUMENTS

| | | |
|---|---|---|
| DE | 4203807 A1 | 8/1993 |
| DE | 4417238 A1 | 9/1994 |
| DE | 10248586 A1 | 5/2003 |
| DE | 102006019052 A1 | 10/2007 |
| DE | 102006024199 A1 | 11/2007 |
| DE | 202008001547 U1 | 5/2008 |
| EP | 0615777 A1 | 9/1994 |
| EP | 1760284 A2 | 9/2006 |
| WO | WO2005073524 A1 | 8/2005 |
| WO | WO2007091969 A1 | 8/2007 |

OTHER PUBLICATIONS

English translation of German Search Report for corresponding DE Application No. 10 2010 056314.5; dated Nov. 22, 2011; 8 pgs.

* cited by examiner

DEVICE FOR DISTRIBUTING FLUIDS IN EXHAUST SYSTEMS

CROSS-REFERENCE TO RELATED APPLICATIONS

This patent application claims the benefit of priority to PCT Application no. PCT/EP2011/005438, filed Oct. 27, 2011, which claims the benefit of priority to German Patent Application No. 102010056314.5, filed Dec. 27, 2010, which are both incorporated herein by reference in their entirety.

FIELD OF THE INVENTION

The subject matter herein relates to an apparatus for distributing fluids.

Due to emission regulations for internal combustion engines becoming more strict, it has become necessary to reduce nitrogen oxides (NOx) in exhaust gas. A possibility consists of reducing the nitrogen oxides to nitrogen and water in a so-called selective catalytic reduction (SCR). This takes place in a so-called SCR catalyst while using a reductant injected into the exhaust gas. A water/urea mixture can be used for this purpose whose urea decomposes to ammonia in the exhaust gas which reacts with the nitrogen oxides. Liquid fuel in the form of different hydrocarbon compounds (HC) can also be injected into the exhaust gas.

It is generally desirable in such reduction processes that the reductant is mixed as uniformly as possible with the exhaust gas and that, while a vaporization or thermolysis of the liquid reductant is achieved, which is as complete as possible to obtain a high efficiency in the reduction and a residue-free operation.

SUMMARY

It is therefore a feature of the invention to improve the distribution of fluids in the exhaust gas and, where necessary, to ensure a complete vaporization of the fluids without residues in as simple a manner as possible.

This is satisfied by an apparatus for distributing fluids in an exhaust system of an internal combustion engine. The apparatus includes an injection device, wherein a combination of a plurality of individual measures for achieving a uniform mixing of the fluids with the exhaust gas and a complete vaporizing of the fluids in the exhaust gas is provided. The individual measure comprises at least one of at least one swirl-generating device and at least one mixing apparatus. The individual measure also includes at least one catalyst. The individual measure further includes an injection nozzle of the injection device which is arranged at a predefined spacing from a wall of the exhaust tract. It has been recognized in accordance with the apparatus that a good mixing and residue-vaporization of the fluids in the exhaust gas can only be achieved if a plurality of measures are combined with one another in a simple manner. In particular the injection characteristic or the spray characteristic of the injection device, the length of the distribution path or vaporization path, the temperature as well as the pipe shape and the pipe cross-section of the respective exhaust system section are decisive for the selection and configuration of the individual measures. A residue-free distribution and vaporization of the fluids in the exhaust gas flow can thus be achieved in a desired manner by taking account of the thermodynamic circumstances and the installation specifications as well as by a suitable matching of the different individual measures.

Further developments of the invention are set forth in the description and in the enclosed drawings.

In accordance with an embodiment of the invention, at least one swirl-generating device is provided which comprises a plurality of gas vanes arranged in the manner of a turbine. Such a swirl-generating device can be provided upstream or downstream of the injection device depending on the application. A good swirl generation in the exhaust gas flow can be achieved by the gas vanes. Furthermore, the gas vanes can act as a vaporizer surface and can thus increase the degree of vaporization. A particularly large vaporizer surface is provided due to the turbine-like arrangement of the gas vanes. The turbine-like embodiment additionally effects a good blocking of the exhaust gas cross-section, with the ratio between the exhaust back pressure and the mixing power being able to be optimized via the length and width as well as the angle of engagement of the vanes.

A mixing apparatus can furthermore be provided which comprises at least one swirl-generating device and one tubular vaporizing device. The mixing apparatus is arranged downstream of the injection device and serves to mix the injected fluids and optionally prehomogenized fluids uniformly with the exhaust gas. A particularly high degree of mixing can be achieved by a combination of a swirl-generating device—which can in turn in particular comprise a plurality of gas vanes arranged in the manner of a turbine—and a tubular vaporizing device, with the order and the spacing between the two components being able to be matched to the respective application.

In accordance with a further embodiment of the invention, a hydrolysis catalyst is provided which is in particular arranged upstream of a so-called SCR catalyst. Such a hydrolysis catalyst can assist an isocyanic acid conversion into ammonia and carbon dioxide and thereby relieve an SCR main catalyst, for example.

A flow guiding element can furthermore be provided which is arranged in the interior of the exhaust tract and is at least regionally spaced apart from a wall of the exhaust tract and which projects at least partly into a flexible decoupling section of the exhaust tract, wherein the flow guiding element in particular ends in a downstream region of the decoupling section. Flexible decoupling sections in the exhaust tract in particular serve to counter a transmission of vibrations or different thermal expansions of exhaust tract components. Such decoupling sections can, for example be designed as corrugated hose, wound hose or spiral wound metallic hose. Depending on the application, a combination of the named hose types can also be present, for example, a wound hose sheathed by a corrugated hose can be provided. Unwanted deposits of the injected fluids and/or of reaction products of the exhaust gas and of the fluids can collect in the recesses and wall irregularities present with such decoupling sections. Such depositions are avoided in that the exhaust gas is conducted through the smooth-walled, flow guiding elements and is thus at least sectionally prevented from flowing past the irregular wall of the decoupling section. The flow guiding element can further influence the flow of the exhaust gas in a desired manner by its special shape, for example, by dimples, depressions, indentations or the liner.

The injection device can in particular be arranged upstream of the flexible decoupling section of the exhaust tract. The advantage of the deposition avoidance by the flow guiding element is then particularly effective. If the application requires, the injection device can also be arranged between two flexible decoupling sections of the exhaust tract.

The flow guiding element can be configured as an inner pipe at least sectionally coaxial to the exhaust tract. Such an inner piper is also called an "inliner". The inner pipe is designed fully walled.

The flow guiding element can have a prolongation section, for example, in the form of a piece of pipe halved in the longitudinal direction, at its downstream end, said prolongation section being interrupted peripherally and in particular being of half-shell shape. Such a prolongation section can be used for the direct catching of fluid residues in order subsequently to vaporizer them.

In accordance with an embodiment, the flow guiding element is sectionally tapered viewed in the direction of the exhaust gas flow. The tapering site is arranged downstream of a mixing apparatus. Alternatively or additionally, a tapering site can also be provided upstream of a mixing apparatus. A tapering effects an increase in the flow rate due to the Venturi effect, which facilitates the mixing of the fluid in the exhaust gas.

In accordance with a further aspect, the flow guiding element is integrated in the exhaust tract such that it can be flowed around by exhaust gas at the outside. The exhaust gas in such an embodiment is therefore not only conducted through the flow guiding element, but is also led past it outwardly. Some of the exhaust gas flow thus bypasses swirl-generating devices and/or mixing apparatus, which can be integrated in the flow guiding element, in a secondary flow. For this purpose, the flow guiding element can be fastened in the associated supporting exhaust pipe by means of a plurality of holding webs such that an air gap is present between the outer wall of the flow guiding element and the inner wall of the exhaust pipe. In this manner, the flow guiding element is heated by the hot exhaust gas flowing past outwardly, whereby a vaporizing of fluid in the interior of the flow guiding element is facilitated.

Furthermore, the swirl-generating device and/or the mixing apparatus can be integrated into a flow guiding element and/or the injection device can open into a flow guiding element. It can hereby be achieved that a fluid distribution apparatus takes up less construction space overall in that namely the flow guiding element is arranged overlapping with another functional component in the exhaust tract.

In accordance with a further embodiment, the injection nozzle is arranged at the wall of the exhaust tract. The fluids are therefore injected close to a pipe wall or line wall, i.e. at the outer margin of the flow. Such an arrangement of the injection nozzle can in particular be provided at apparatus in which the injection nozzle is arranged in a curved or angled section of the exhaust tract. If the application requires, the injection nozzle can also be arranged in a predefined, relatively small spacing from the wall.

In accordance with an alternative embodiment, the injection nozzle is arranged centrally with respect to a cross-section of the exhaust tract, i.e. the fluids are injected at the center of the flow. Such a central arrangement can also include an arrangement at the predefined small spacing from the center of the cross-sectional surface of the respective line section.

The injection nozzle can be configured to spray the fluids in the manner of a hollow cone or of a solid cone. Injection nozzles having spray characteristics of a hollow cone type are relatively inexpensive and available in a variety of variants. Injection nozzles having spray characteristics of a solid cone, in contrast, ensure a better degree of mixing of the sprayed fluid in the surrounding gas flow.

Two injection nozzles set against one another can also be provided for a spraying of the fluids in a flat-cone manner. Such a constellation is in particular advantageous with an oval line cross-section in the respective exhaust system section.

The injection device can be configured for spraying the fluids with a predefined average droplet size. The Sauter mean diameter (SMD) can be used as the parameter for the droplet size. The efficiency of the distribution apparatus can thus be optimized by a direct variation of the droplet size. For this purpose—provided the droplet size is known—the required components of the distribution apparatus as well as the corresponding parameters can be matched to the droplet size. Conversely, with predefined components and parameters, a specific ideal droplet size can be selected in order thus to ensure a deposition-free operation of the distribution apparatus. Depending on the application, the average droplet size of the injection device can therefore be an input parameter or an output parameter of the distribution apparatus to be configured.

In accordance with a further embodiment, the combination of a plurality of individual measures comprises at least one swirl-generating device and an injection nozzle of the injection device which is arranged centrally with respect to a cross-section of the exhaust tract and is configured for a spraying of the fluids in a solid cone manner with a droplet size of at most 25 μm Sauter mean diameter. It has namely been found that with a central injection having spray characteristics of a solid cone type and relatively small droplets, only one swirl-generating device—arranged upstream or downstream of the injection device—is sufficient to achieve a uniform distribution of the fluids vaporized in the gas phase. Further expensive components of the distribution apparatus can thus be dispensed with.

In accordance with a further embodiment of the invention, the combination of a plurality of individual measures comprises at least one swirl-generating device which is provided upstream of the injection device, at least one mixing apparatus which is provided downstream of the injection device and which comprises at least one tubular vaporizer device, and comprises an injection nozzle of the injection device which is arranged centrally with respect to a cross-section of the exhaust tract and is configured for a spraying of the fluids in a hollow cone manner with a droplet size of at most 25 μm Sauter mean diameter. Provided that therefore a mixing apparatus having at least one tubular vaporizer device and arranged downstream of the injection device is provided in addition to the swirl-generating device, a simple spraying injection nozzle of a hollow cone type can be made use of.

In accordance with a further embodiment of the invention, the combination of a plurality of individual measures comprises at least one swirl-generating device which is provided upstream of the injection device, at least one mixing apparatus which is provided downstream of the injection device and which comprises at least one swirl-generating device, and comprises an injection nozzle of the injection device which is arranged centrally with respect to a cross-section of the exhaust tract and is configured for a spraying of the fluids in a solid cone manner with a droplet size of at least 25 μm Sauter mean diameter. In the case of larger droplets, two swirl-generating devices are therefore required for a uniform distribution—one upstream and one downstream of the injection device. On use of an injection nozzle spraying in a full-cone manner, the arising of secondary products can be avoided.

In accordance with a further embodiment of the invention, the combination of a plurality of individual measures comprises at least one swirl-generating device which is provided upstream of the injection device, at least one mixing apparatus which is provided downstream of the injection device and which comprises at least one swirl-generating device and a tubular vaporizer device, and comprises an injection nozzle of the injection device which is arranged centrally with respect to a cross-section of the exhaust tract and is configured for a spraying of the fluids in a hollow cone manner with a droplet size of at least 25 μm Sauter mean diameter. In this constellation, two swirl-generating devices and one tubular vaporizer device are provided. In turn, only one simple injection nozzle spraying in a hollow-cone manner is to be provided.

In accordance with a further embodiment of the invention, the combination of a plurality of individual measures comprises at least one mixing device which is provided downstream of the injection device, and which comprises at least one swirl-generating device, and comprises an injection nozzle of the injection device which is arranged at the wall of the exhaust tract and is configured for a spraying of the fluids in a solid cone manner with a droplet size of at least 50 μm Sauter mean diameter. In the case of an injection of the fluids close to the wall, it is therefore expedient to design the injection nozzle for larger droplets. Furthermore, a swirl-generating device is to be provided downstream of the injection device.

In accordance with a further embodiment of the invention, the combination of a plurality of individual measures comprises at least one mixing device which is provided downstream of the injection device, and which comprises at least one swirl-generating device and a tubular vaporizer device, and comprises an injection nozzle of the injection device which is arranged at the wall of the exhaust tract and is configured for a spraying of the fluids in a hollow cone manner with a droplet size of at least 50 μm Sauter mean diameter. On a use of an injection nozzle spraying in a hollow cone manner and of an injection close to the wall, it is therefore expedient to use a mixing apparatus which is arranged downstream of the injection device and which comprises at least one swirl-generating device and at least one tubular vaporizer device.

In accordance with the invention, it was in particular taken into account in the determination of the embodiments that the injected droplets vaporize the faster, the smaller they are. However, smaller droplets are also more difficult to introduce into the exhaust gas flow, i.e. the penetration depth falls as the diameter of the droplets reduces or as the pulse of the droplets reduces.

BRIEF DESCRIPTION OF THE DRAWINGS

The invention will be described in the following by way of example with reference to the drawings.

FIG. 1 shows a partially cut-away perspective view of an exhaust tract section in which an embodiment of an apparatus for distributing fluids is integrated;

FIG. 2 shows a partially cut-away perspective view of another embodiment of an the apparatus in which is integrated in an angled exhaust tract;

FIG. 3 shows a partially cut-away perspective view of a further embodiment of an the apparatus; and FIG. 4 is a schematic illustration of yet another embodiment of the apparatus;

FIG. 5 is a schematic illustration of yet another embodiment of the apparatus;

FIG. 6 is a schematic illustration of yet another embodiment of the apparatus;

FIG. 7 is a schematic illustration of yet another embodiment of the apparatus; and FIG. 8 is a schematic illustration of yet another embodiment of the apparatus.

DETAILED DESCRIPTION

FIG. 1 shows a pipe section 11 of an exhaust tract through which emissions to be purified of a diesel engine, not shown, flow along an exhaust gas flow direction A. An inner pipe 12 is arranged in the pipe section 11 and is designed as an exhaust mixer pipe as will be described more exactly in the following. The pipe section 11 with the inner pipe 12 is arranged before an SCR catalyst, likewise not shown, in the exhaust gas flow direction A. An apparatus 13 for distributing a fluid, e.g. a water-urea mixture, in the exhaust gas is integrated into the inner pipe 12. The apparatus comprises an injection device 15 having an injection nozzle 17 opening into the inner pipe 12. The fluid to be injected is sprayed into the flowing exhaust gas by means of the injection nozzle 17. As can be seen from FIG. 1, the injection nozzle 17 is seated centrally, with respect to the injection nozzle 17, in the pipe section 11, that is on the central longitudinal axis L of the pipe section 11. The injection nozzle 17 can be configured in dependence on the application to spur the fluid in a hollow cone manner or in a solid cone manner. Furthermore, the injection device 15, including the injection nozzle 17, is adapted such that a predefined average droplet size is generated on the spraying.

The apparatus 13 furthermore comprises a first swirl-generating device 19 arranged before the injection device 15 in the exhaust gas flow direction A as well as a mixing apparatus 20 arranged after the injection device 15 in the exhaust gas flow direction A. The mixing device 20 comprises a second swirl-generating device 21 and a tubular vaporizer device 23 arranged behind it in the exhaust gas flow direction A. The first swirl-generating device 19 and the second swirl-generating device 21 each comprise gas vanes 25 arranged and configured in the manner of turbines. The gas vanes 25 extend substantially radially outwardly from the central longitudinal axis L of the pipe section 11, but are bent in on themselves so that their contact line with the pipe section 11 extends along a spiral line. A strong blockage of the cross-section of the pipe section 11 thereby results. On flowing through the swirl-generating devices 19, 21, turbulences are generated in the exhaust gas flow which assist a mixing of the fluid with the flowing exhaust gas. To further improve the mixing, the gas vanes 25 can be shaped so that a turbulence-amplifying swirl direction reversal takes place between the first swirl-generating device 19 and the second swirl-generating device 21.

The tubular vaporizer device 23 has a central pipe 27 as well as outer surfaces 29 which are formed in the manner of blooms and which further improve the mixing of the fluid and of the exhaust gas and moreover act as vaporizer surfaces and/or as impact plates in order thus to promote a vaporization.

The surfaces of the elements 19, 21 and 23 can be structured or perforated to further improve the atomization and distribution of the fluid.

Depending on the application, a hydrolysis catalyst, not shown, can furthermore be provided at any desired position of the pipe section 11 to relieve the SCR catalyst.

The exhaust gas flows through the pipe section 11 in accordance with the exhaust gas flow direction A during operation, with the swirl-generating devices 19, 21 and the tubular vaporizer device 23 being heated. The exhaust gas exiting the pipe section 11 subsequently enters into the SCR catalyst. To generate and/or facilitate a reduction of nitrogen oxides in the SCR catalyst, a water-urea mixture is e.g. injected into the exhaust gas flow by means of the injection device 15. In the embodiment shown, only a single injection nozzle 17 is associated with the injection device 15. In specific applications, the injection device 15 can, however, also comprise a plurality of injection nozzles 17. A mixing takes place between the exhaust gas and the injected droplets of the water-urea mixture due to the turbulences generated in the exhaust gas jet by means of the first swirl-generating device 19. The mixture thus produced then moves with the exhaust gas into the second swirl-generating device 21 in which the exhaust gas with the water-urea mixture is set into a rotation about the central longitudinal axis L of the pipe section 11. A further improved mixing of the exhaust gas with the water/urea mixture thereby takes place. In addition, the gas vanes 25 of the swirl-generating device 21 also act as a vaporizer surface.

In the further extent, the partly vaporized water-urea mixture moves with the exhaust gas into the tubular vaporizer device 23 where a further mixing of the water-urea mixture with the exhaust gas and a further vaporization of the water-urea mixture takes place at the corresponding evaporator surfaces.

After the exit from the pipe section 11, the exhaust gas optionally moves into a further vaporizer pipe. Any liquid portions of the water-urea mixture possibly still present can be vaporized here so that then only gaseous reductant moves into the SCR catalyst. The reduction of nitrogen oxides to nitrogen in water takes place in this.

The fluid distribution apparatus 13 is therefore divided into a plurality of functional units which are arranged in a plurality of stages with respect to the exhaust gas flow direction A. Which stages are to be provided in a specific application, the order in which the stages are to be arranged and which spacing is to be provided between the stages is determined by the respective spatial and thermodynamic circumstances and can be determined such that particularly a complete vaporization of the injected fluid results within the inner pipe 12. The skilled person naturally endeavors in this process generally to provide as few functional groups as possible or to provide components which are as small and as inexpensive as possible. A configuration is therefore always desirable in which a deposition-free operation is possible while using as few means as possible which are as simple as possible.

It has resulted for the central or close-to-the-axis injection shown in FIG. 1 and for an inner pipe diameter of 70 mm that only the first swirl-generating device 19 or the second swirl-generating device 21 selectively is sufficient to achieve a complete and residue-free vaporization provided that the injection nozzle 17 is configured to spray the fluid in a sold cone manner and the Sauter mean diameter of the droplets amounts to at most 25 µm. On a use of an injection nozzle spraying in the manner of a hollow cone, it is, in contrast, advantageous to provide both the first swirl-generating device 19 and the tubular vaporizer device 23. Provided that an injection nozzle spraying in the manner of a sold cone is used and the Sauter mean diameter of the droplets amounts to at least 25 µm, it is to provide both the first swirl-generating devise 19 and the second swirl-generating device 21. Provided, in contrast, that an injection nozzle spraying in the manner of a hollow cone is used and the Sauter mean diameter of the droplets amounts to at least 25 µm, both the first swirl-generating device 19 and the second swirl-generating device 21, and additionally the tubular evaporator device 23, are to be provided. All above-described constellations are very well suited to achieve a residue-free vaporization of the mixture. If it should, however, be necessary, further swirl-generating devices and/or vaporizer devices can also be provided.

Figure 2:
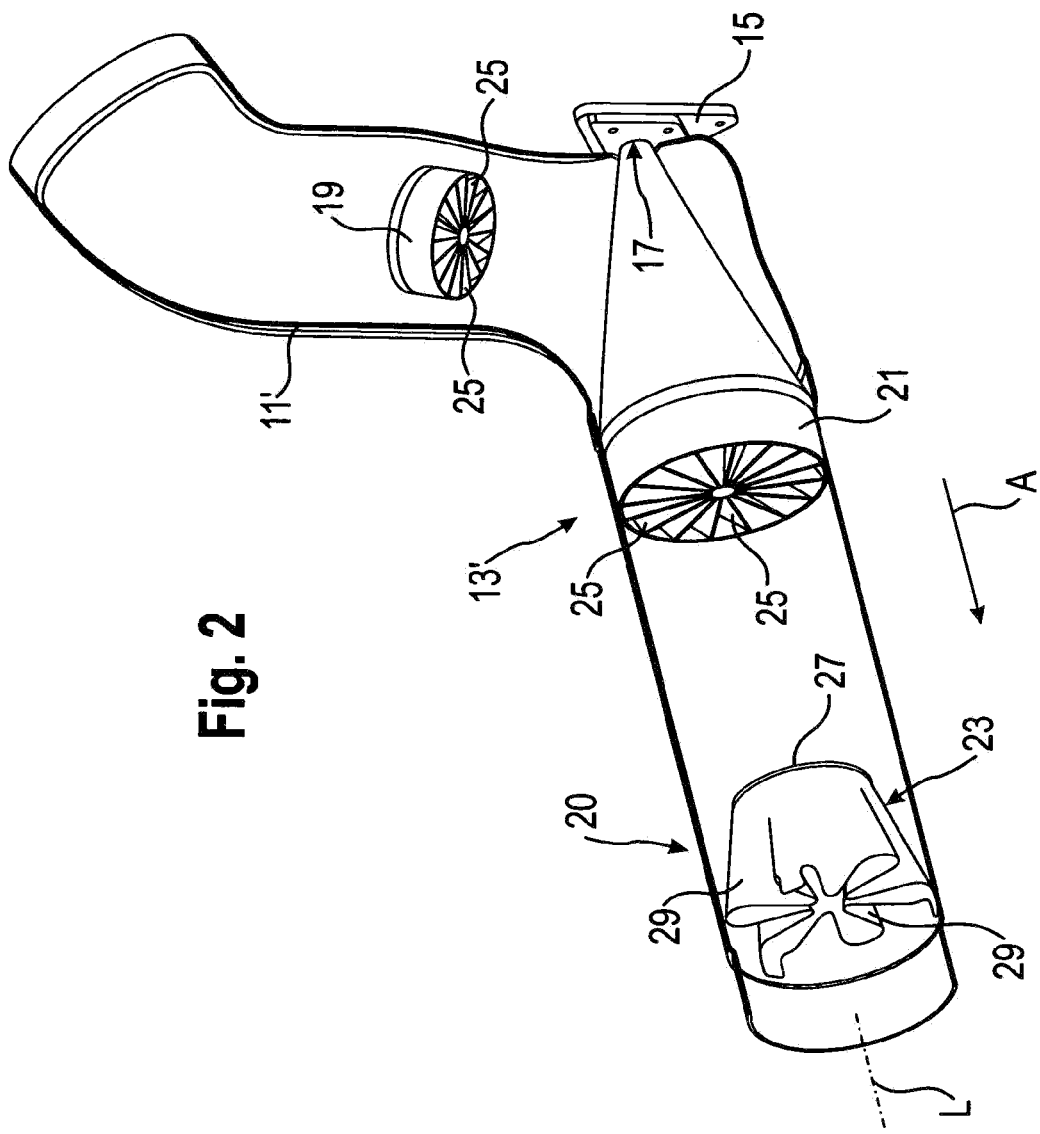

FIG. 2 shows a similar apparatus 13 to the one shown in FIG. 1 which is, however, integrated into an angled pipe section 11' of the exhaust tract. The injection nozzle 17 is arranged in the region of the kink at the wall of the pipe section 11'. As in the embodiment in accordance with FIG. 1, a first swirl-generating device 19, a second swirl-generating device 21 and a tubular vaporizer device 23 are provided following one another viewed in the exhaust gas flow direction A. It has been found that only the second swirl-generating device 21 is required to achieve a complete vaporization provided that an injection nozzle spraying in the manner of a solid cone is used and the Sauter mean diameter of the droplets amounts to at least 50 µm. Provided, in contrast, that an injection nozzle spraying in the manner of a hollow cone is used and the Sauter mean diameter of the droplets amounts to at least 50 µm, both the second swirl-generating device 21 and the tubular vaporizer device 23 are to be provided. Both described constellations are very well suited to achieve a residue-free vaporization of the fluid. With an enlarged inner pipe diameter, e.g. an inner pipe diameter of 140 mm, it may be expedient also to increase the droplet size, e.g. up to 100 µm. In another respect, the operation of the apparatus is as in the variant in accordance with FIG. 1.

Figure 3:
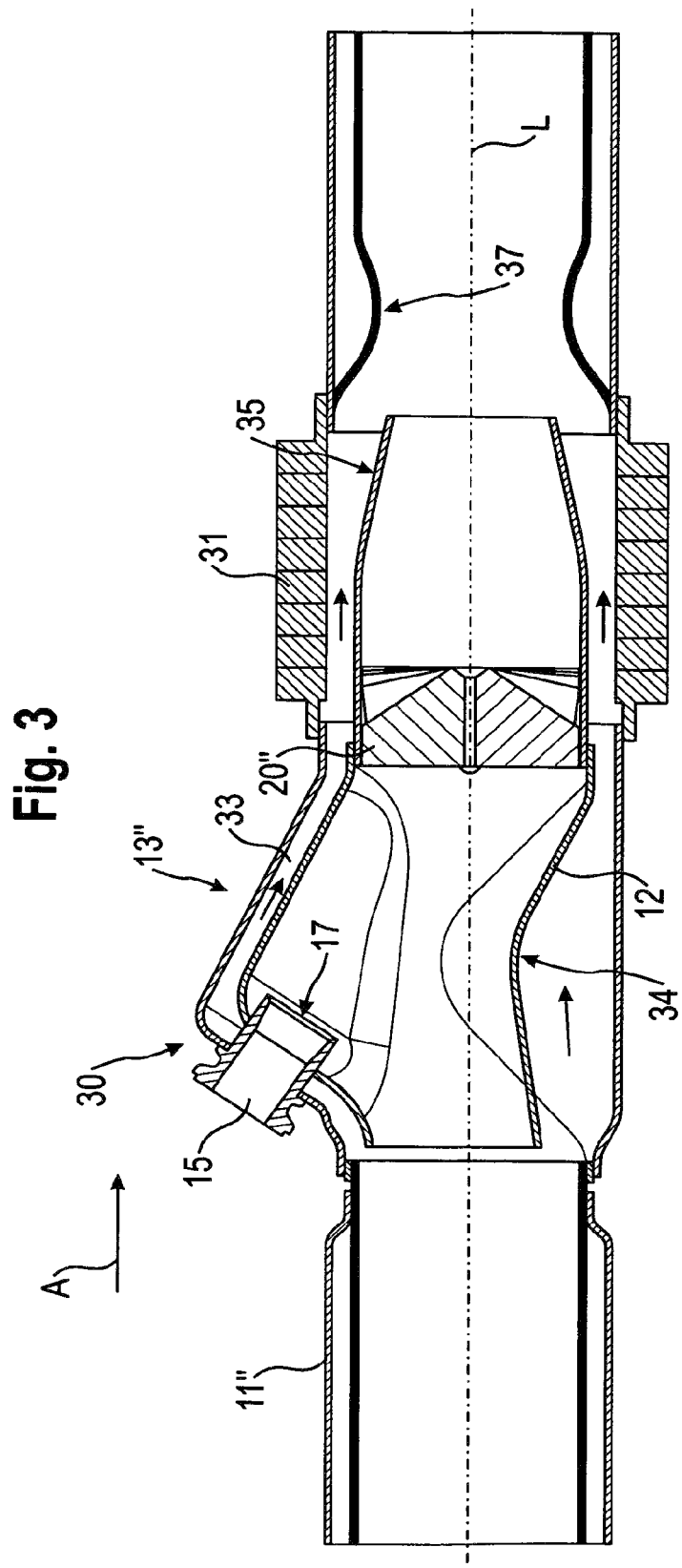
Figure 4:
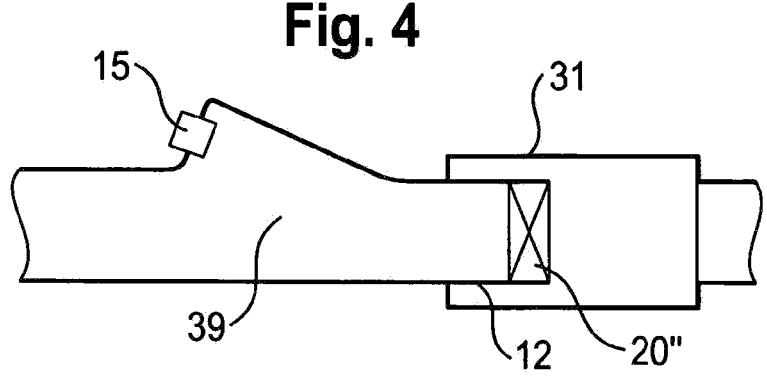

FIG. 3 shows an apparatus 13" in accordance with a further embodiment of the invention which is integrated into a exhaust tract 11" substantially running in a straight line similar to the exhaust track 11 in accordance with FIG. 1. The injection device 15 is here arranged in an indentation 30 of the exhaust tract 11" such that the injection nozzle 17 sprays the fluid obliquely to the front into the exhaust gas flow. The injection nozzle 17 in this respect opens into an inner pipe 12 into which a swirl-generating mixing apparatus 20" is also integrated. As can be seen from FIG. 3, there is an air gap 33 between the inner pipe 12 and the wall of the exhaust tract 11" so that some of the exhaust gas flow flows past the inner pipe 12 at the outside, which is illustrated by arrows in FIG. 3. The portion of the exhaust gas flow flowing through the inner pipe 12 and the portion of the exhaust gas flow flowing around the inner pipe 12 combine downstream of the inner pipe 12. The inner pipe 12 has a tapering 35 at its downstream end which effects an increase in the flow speed due to the Venturi effect. The inner pipe 12 is heated by the flowing around and a vaporization of fluid at the surfaces of the inner pipe 12 and of the mixing apparatus 20" is thus facilitated. The exhaust tract 11" has a constriction point 37 directly downstream of the tapering 35 by which a faster mixing of the exhaust gases of the main flow and of the secondary flow can be achieved.

The exhaust tract 11" has a decoupling section 31 which has a reduced stiffness with respect to the preceding and following sections of the exhaust gas flow 11" in order thus to counter the transfer of vibrations and to avoid tension. The decoupling section 31 is designed as a spiral wound metallic hose which is sheathed by a flexible corrugated pipe of thin metal plate. The inner pipe 12 extends along the total length of the decoupling section 31 and only ends directly downstream of the decoupling section 31. The fastening of the inner pipe 12 to the exhaust tract 11" takes place only in the region of rigid components of the pipe section 11" and not in the region of the flexible decoupling section 31. In other words, the inner pipe 12 projects freely into the decoupling section 31 so that the movability of the exhaust tract 11" made possible by the decoupling section 31 is maintained. At the same time, the inner pipe 12 shields the wall of the decoupling section 31 from the main flow of the exhaust gas and thus counters a fluid deposition on the irregular surface of the decoupling section 31. An indentation 34 of the inner pipe 12 effects a direct guidance of the exhaust gas flow in the sense that the flow direction is adapted better to the injection direction.

It is understood that the mixing apparatus 20" may comprise further components such as a plurality of different swirl-generating devices or a tubular vaporizer device. An arrangement having a flowed-around inner pipe 12 can also generally also be combined with the above-described measured to improve mixing. It can, however, also be used without such measures.

Figure 5:
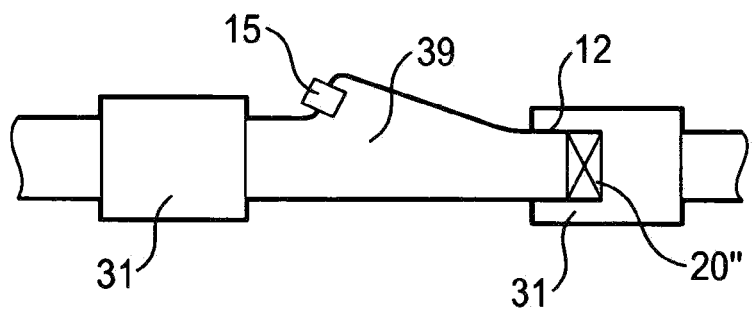
Figure 6:
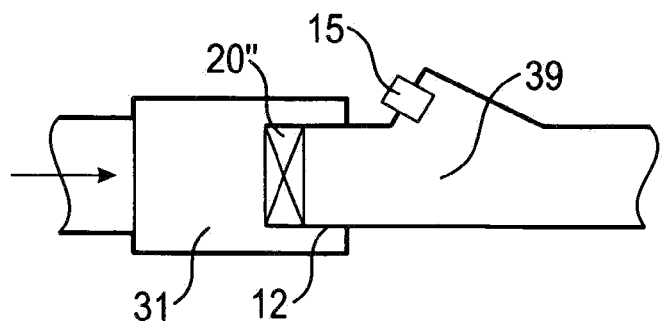
Figure 7:
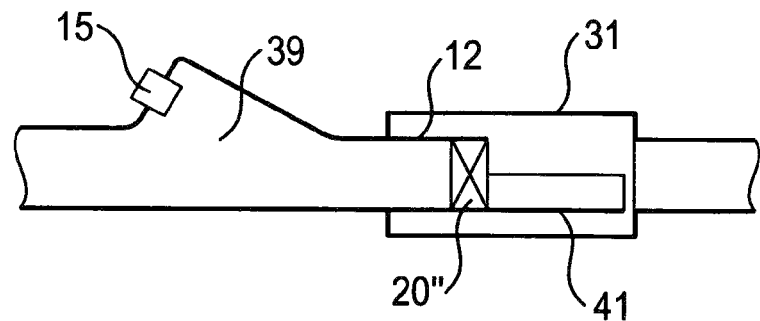
Figure 8:
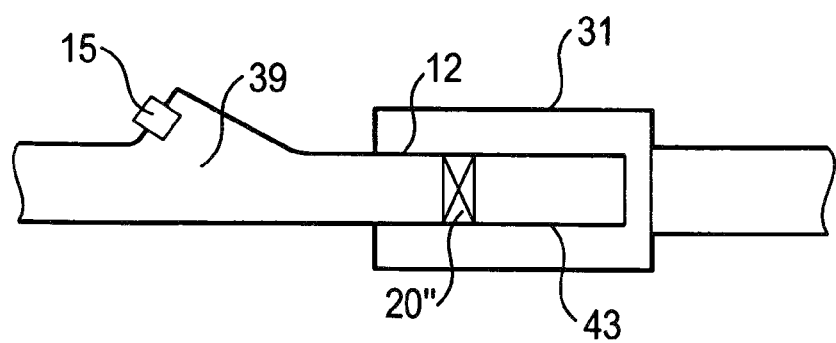

FIGS. 4 to 8 show further exemplary embodiments of the invention. In accordance with FIG. 4, the inner pipe 12 can form a part of a metering module 39 containing the injection device 15 as well as a mixing apparatus 20" and can extend only partly into a decoupling section 31. FIG. 5 shows an embodiment in which a metering module 39 is arranged between two decoupling sections 31. Since the mixing apparatus 20" is so-to-say arranged in the decoupling section 31, the required construction space is reduced in size with respect to a system having components arranged behind one another. In accordance with FIG. 6, the mixing apparatus 20" associated with the inner pipe 12 can also be arranged upstream of the injection device 15 and can thus act as a pure swirl-generator. In the aspect in accordance with FIG. 7, a half-shell shaped prolongation 41 is provided at the downstream end of the inner pipe 12 and primarily protects the lower part of the decoupling section 31 from fluid droplets exiting the mixing apparatus 20" in the position of use and vaporizes said droplets. As can be seen from FIG. 8, the mixing apparatus 20" can also be provided at the end of a metering module 39, with an extension pipe 43 adjoining the mixing apparatus 20".

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. An apparatus for distributing fluids in an exhaust system of an internal combustion engine, the apparatus comprising:
   an injection device, wherein a combination of a plurality of individual measures for achieving a uniform mixing of the fluids with the exhaust gas and a complete vaporizing of the fluids in the exhaust gas is provided, wherein the individual measures comprise:
   at least one swirl-generating device;
   at least one mixing apparatus comprising a tubular vaporizer device; and
   an injection nozzle of the injection device arranged at a predefined spacing from a wall of an exhaust tract, wherein the at least one swirl-generating device comprises a plurality of gas vanes arranged in the manner of a turbine, and wherein the injection nozzle is arranged centrally with respect to a cross-section of the exhaust tract.

2. The apparatus in accordance with claim 1, the injection device discharging before a SCR catalyst in the exhaust tract.

3. The apparatus in accordance with claim 1, wherein the at least one swirl-generating device is integrated into a flow guiding element, and wherein the injection device discharges into a flow guiding element.

4. The apparatus in accordance with claim 1, wherein the injection nozzle is arranged in an angled section of the exhaust tract.

5. The apparatus in accordance with claim 1, wherein the injection nozzle is configured to spray the fluids in a hollow cone or solid cone.

6. The apparatus in accordance with claim 1, wherein the injection device for spraying the fluids is configured with a predefined average droplet size.

7. The apparatus in accordance with claim 1, wherein the injection nozzle of the injection device configured for the spraying of the fluids in the manner of a solid cone with a droplet size of at most 25 μm Sauter mean diameter.

8. The apparatus in accordance with claim 1, wherein the at least one swirl-generating device is disposed upstream of the injection device, the at least one mixing apparatus is disposed downstream of the injection device device and wherein the injection nozzle of the injection device is configured for the spraying of the fluids in the manner of a hollow cone with a droplet size of at most 25 μm Sauter mean diameter.

9. The apparatus in accordance with claim 1, wherein the at least one swirl-generating device is disposed upstream of the injection device, the at least one mixing apparatus is disposed downstream of the injection device and comprises at least one swirl-generating device, and wherein the injection nozzle of the injection device is configured for the spraying of the fluids in the manner of a solid cone with a droplet size of at least 25 μm Sauter mean diameter.

10. The apparatus in accordance with claim 1, wherein the at least one swirl-generating device is disposed upstream of the injection device, the at least one mixing apparatus is disposed downstream of the injection device and wherein the injection nozzle of the injection device is configured for the spraying of the fluids in the manner of a hollow cone with a droplet size of at least 25 μm Sauter mean diameter.

11. The apparatus in accordance with claim 1, further comprising at least one catalyst.

12. The apparatus in accordance with claim 11, wherein the catalyst is a hydrolysis catalyst.

13. The apparatus in accordance with claim 12, wherein the hydrolysis catalyst is arranged upstream of a SCR catalyst.

14. An apparatus for distributing fluids in an exhaust system of an internal combustion engine, the apparatus comprising:
   an injection device, wherein a combination of a plurality of individual measures for achieving a uniform mixing of the fluids with the exhaust gas and a complete vaporizing of the fluids in the exhaust gas is provided, wherein the individual measures comprise:
   at least one swirl-generating device;
   at least one mixing apparatus; and
   an injection nozzle of the injection device arranged at a predefined spacing from a wall of an exhaust tract, wherein the at least one swirl-generating device comprises a plurality of gas vanes arranged in the manner of a turbine, and wherein the injection nozzle is arranged centrally with respect to a cross-section of the exhaust tract; and a flow guiding element arranged in the interior of the exhaust tract and spaced apart at least sectionally from a wall of the exhaust tract and projecting at least partly into a flexible decoupling section of the exhaust tract.

15. The apparatus in accordance with claim 14, wherein the flow guiding element ends in a downstream region of the flexible decoupling section.

16. The apparatus in accordance with claim 14, wherein the injection device is arranged upstream of the flexible decoupling section of the exhaust tract.

17. The apparatus in accordance with claim 14, wherein the flow guiding element is configured as at least sectionally coaxial to the exhaust tract.

18. The apparatus in accordance with claim 14, wherein the flow guiding element comprises a peripherally interrupted prolongation section at a downstream end.

19. The apparatus in accordance with claim 14, wherein the flow guiding element has a peripherally interrupted half-shell prolongation section at a downstream end.

20. The apparatus in accordance with claim 14, wherein the flow guiding element (12) is sectionally tapered viewed in the exhaust gas flow direction (A).

21. The apparatus in accordance with claim 14, wherein the flow guiding element is integrated into the exhaust tract such that it can be flowed around by exhaust gas at an exterior thereof.

22. An apparatus for distributing fluids in exhaust systems of an internal combustion engine, the apparatus comprising:
an injection device, wherein a combination of a plurality of individual measures for achieving a uniform mixing of the fluids with the exhaust gas and a complete vaporizing of the fluids in the exhaust gas is provided, wherein the individual measures comprise:
at least two swirl-generating devices;
at least one mixing apparatus; and
an injection nozzle of the injection device arranged at a predefined spacing from a wall of an exhaust tract,
wherein the at least two swirl-generating devices each comprises a plurality of gas vanes arranged in the manner of a turbine.

23. The apparatus in accordance with claim 22, wherein the injection nozzle is arranged at the wall of the exhaust tract.

24. The apparatus in accordance with claim 22, wherein the at least one mixing apparatus is downstream of the injection device, wherein the injection nozzle of the injection device is configured for spraying of the fluids in the manner of a solid cone with a droplet size of at least 50 μm Sauter mean diameter.

25. The apparatus in accordance with claim 22, wherein the at least one mixing apparatus is downstream of the injection device and comprises a tubular vaporizer device, wherein the injection nozzle of the injection device is configured for spraying of the fluids in the manner of a hollow cone with a droplet size of at least 50 μm Sauter mean diameter.

* * * * *